(12) United States Patent
Maire et al.

(10) Patent No.: US 12,202,392 B2
(45) Date of Patent: Jan. 21, 2025

(54) SEAT ELEMENT, IN PARTICULAR, HEADREST OF A VEHICLE SEAT

(71) Applicant: Faurecia Autositze GmbH, Hannover (DE)

(72) Inventors: Anthony Maire, Dorans (FR); Claude Bour, Bückeburg (DE); Anne-Sophie Cabouillet, Boissy-le-Sec (FR); Egon Forster, Karlsruhe (DE)

(73) Assignee: Faurecia Autositze GmbH, Hannover (DE)

( * ) Notice: Subject to any disclaimer, the term of this patent is extended or adjusted under 35 U.S.C. 154(b) by 96 days.

(21) Appl. No.: 17/974,612

(22) Filed: Oct. 27, 2022

(65) Prior Publication Data

US 2023/0125737 A1 Apr. 27, 2023

(30) Foreign Application Priority Data

Oct. 27, 2021 (DE) ..................... 10 2021 127 989.5

(51) Int. Cl.
  *B60N 2/80* (2018.01)
  *B60N 2/64* (2006.01)
  *D04H 1/56* (2006.01)

(52) U.S. Cl.
  CPC ............... *B60N 2/80* (2018.02); *B60N 2/646* (2013.01); *D04H 1/565* (2013.01); *B60N 2002/899* (2018.02); *D10B 2505/12* (2013.01)

(58) Field of Classification Search
  CPC .... B60N 2/80; B60N 2/646; B60N 2002/899; D04H 1/565; D10B 2505/12
  See application file for complete search history.

(56) References Cited

U.S. PATENT DOCUMENTS

| 6,106,920 | A | 8/2000 | Pichon | |
|---|---|---|---|---|
| 10,286,820 | B2 * | 5/2019 | Shindo | B60N 2/7017 |
| 10,399,848 | B2 * | 9/2019 | Kristo | B29D 99/0092 |
| 11,718,212 | B2 * | 8/2023 | Cabouillet | B60N 2/58 |
| | | | | 297/452.61 |
| 2006/0071528 | A1 | 4/2006 | Foelster | |
| 2006/0267260 | A1 * | 11/2006 | Stowe | B60N 2/7017 |
| | | | | 267/143 |
| 2008/0075915 | A1 * | 3/2008 | Wening | B32B 27/32 |
| | | | | 428/95 |
| 2008/0083855 | A1 | 4/2008 | Oda | |

(Continued)

FOREIGN PATENT DOCUMENTS

| DE | 69800347 T2 | 2/2001 |
|---|---|---|
| DE | 102008035610 A1 | 2/2010 |

(Continued)

*Primary Examiner* — Philip F Gabler
(74) *Attorney, Agent, or Firm* — Barnes & Thornburg LLP

(57) ABSTRACT

The present disclosure relates to a seat element, in particular, a headrest for a vehicle seat, the seat element comprising at least one support bar made of metal, a first layer provided at an exterior surface of the support bar, and a cushion made of an upholstery material. Hereby, the first layer is formed by blowing on first fibers made of plastics which are thermally welded directly or indirectly to the exterior surface.

At least part of the first fibers extends away from the exterior surface and/or the first layer towards the outside into the upholstery material and is thermally cross-linked with the upholstery material, in particular, blown-on further fibers.

14 Claims, 2 Drawing Sheets

(56) References Cited

U.S. PATENT DOCUMENTS

| | | | |
|---|---|---|---|
| 2009/0267401 A1* | 10/2009 | Ito | D04H 1/74 |
| | | | 264/258 |
| 2010/0060038 A1* | 3/2010 | Takakura | B60R 13/083 |
| | | | 296/193.07 |
| 2012/0181841 A1* | 7/2012 | Petzel | A47C 7/02 |
| | | | 297/452.48 |
| 2018/0050619 A1 | 2/2018 | Tabata | |
| 2018/0339622 A1* | 11/2018 | Kristo | D04H 1/558 |

FOREIGN PATENT DOCUMENTS

| | | |
|---|---|---|
| DE | 102014213373 A1 | 10/2015 |
| EP | 2329987 B1 | 10/2013 |
| FR | 2972398 B1 | 10/2013 |
| FR | 3080585 B1 | 5/2020 |

\* cited by examiner

SEAT ELEMENT, IN PARTICULAR, HEADREST OF A VEHICLE SEAT

PRIORITY CLAIM

This application claims priority to German Patent Application No. DE 10 2021 127 989.5, filed Oct. 27, 2021, which is expressly incorporated by reference herein.

BACKGROUND

The present disclosure relates to a seat element of a vehicle seat, where the seat element may be, in particular, a headrest.

SUMMARY

According to the present disclosure, a seat element may be manufactured, in particular, by means of the manufacturing method according to the present disclosure; the manufacturing method according to the present disclosure serves, in particular, for manufacturing the seat element according to the present disclosure. The seat element is, in particular, a headrest of a vehicle seat.

In illustrative embodiments, a first layer comprising first fibers is formed around an exterior surface of the at least one metal support bar. The first fibers are welded, in particular, thermally or, respectively, by welding onto the exterior surface thereby allowing good adhesion to the exterior surface of the metal headrest bar. The first layer may be formed exclusively from the welded-on first fibers.

In illustrative embodiments, at least part of the first fibers extends outwards away from the first layer and is received in the upholstery material of the cushion. Thus, the cushion is formed around the at least one headrest bar and receives the first fibers. By extending outwards from the first layer, the first fibers form a large surface which is connected to the further upholstery material, in particular, further fibers. This connection may be made, in particular, by means of thermal cross-linking or, respectively, welding, where the first fibers are cross-linked, in particular, with the further fibers, in particular, of the same kind.

Besides the further fibers, the upholstery material may comprise fillers; e.g., foam material or granulates, in particular, made from plastics, thereby attaining a good cross-linking with the sticking-out first fibers.

The present disclosure enables, in particular, an advantageous, cost-efficient, and quick manufacturing process, in that the first fibers are attached to the exterior surface of the headrest bar, in particular, by means of pressure heat. This step of attaching may be carried out, in particular, by blowing on the fibers. Thus, the first fibers form the first layer at the exterior surface which surrounds the exterior surface of the metal headrest bar. Such a welding process provides a good adhesion of the plastic layer to the exterior surface. Thus, advantageous, it is possible to form the first layer surrounding the support bar by the pressed-on fibers alone.

Hereby, at least part of the ends of the first fibers sticks out from the first layer towards the outside so that the ends of the first fibers will cross-link, in particular, with further fibers in the subsequent step of attaching the further upholstery material thereby forming a firm structure.

The step of attaching the further upholstery material may, in particular, may follow immediately after the attaching or blowing-on respectively of the first fibers. Thus, it is possible to firstly form the first layer and subsequently the further cushion material in a continuous process of blowing on fibers, whereby the further upholstery material may comprise, in addition to the further fibers, also further fillers such as, e.g., foam particles and granulates.

Thus, the making of the cushion can be carried out, in particular, by blowing-on fibers as well as a pressing under exertion of pressure and heat in a suitable tool, with the tool determining the shape of the pillow. Hereby, the making may be carried out, in particular, in a furnace or, respectively, a heating means.

Subsequently advantageously, a covering layer is applied onto the cushion.

Thus, a manufacturing procedure is created which is fast or, respectively, comprises relatively few procedure steps.

A further advantage of the present disclosure lies in the fact that recycled plastic material can be used as upholstery material, in particular, for the additional fillers, which may be obtained, e.g., by recycling headrests cushions.

The support bars may be shaped, e.g., u-shaped or bracket-shaped respectively, i.e. two support bars with a connection in the middle region. When attaching the upholstery material, preferably, all regions of the bracket are firmly received.

According to one embodiment, the pillow may be formed by the support bars and the welded cushion material alone, i.e., in particular, by the fibers. Preferably, it is not necessary to apply further structural elements.

According to a further embodiment, a grid may first be placed around the at least one support bar so as to enlarge the surface for receiving the first fibers. The grid may be formed from metal or plastics. Thus, the first fibers adhere to the exterior surface of the support bar and in addition to the grid. Such a manufacturing process, too, can be carried out with little complexity because kit is merely needed to first apply the grip around the support bar. In principle, any part having structured openings can be used as grid.

According to one embodiment, first, a bonding layer or adhesive film may be applied onto the exterior surface or part of the exterior surface of the support bar.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
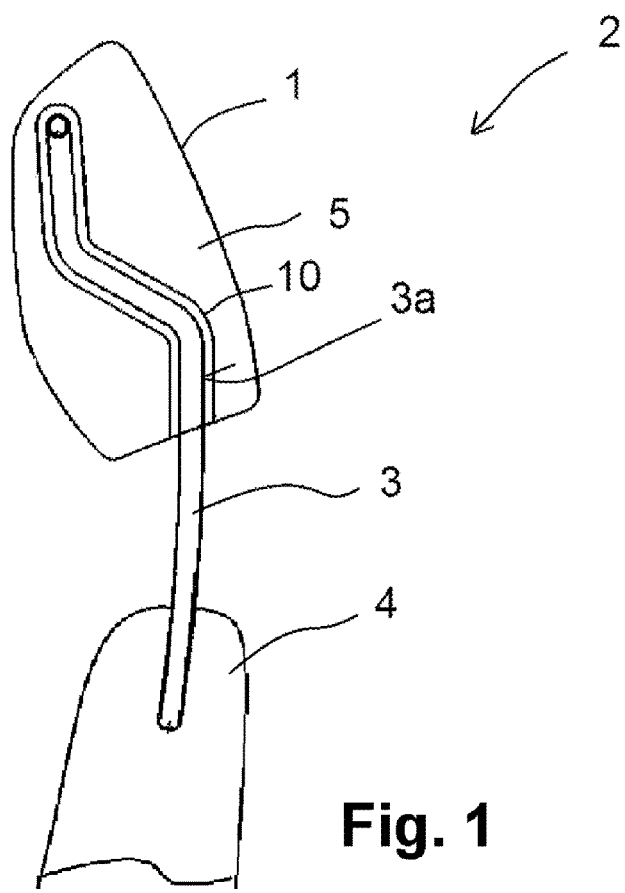
FIG. 1 shows a headrest according to one embodiment of the present disclosure in a sectional view.

According to FIG. 1, a headrest 1 is part of a vehicle seat 2, in particular, of a vehicle seat 2 of a motor vehicle. The headrest 1 comprises one or more support bars 3. Thus, e.g., two headrest bars 3 may be formed as part of a u-shaped bracket, whereby the support bars 3 may be received, in particular, in a height adjustable manner, in a backrest 4 of the vehicle seat 1. The headrest 1 further comprises a cushion 5 firmly received on the support bars 3 and serving to support the head of the seat occupant.

Figure 2:
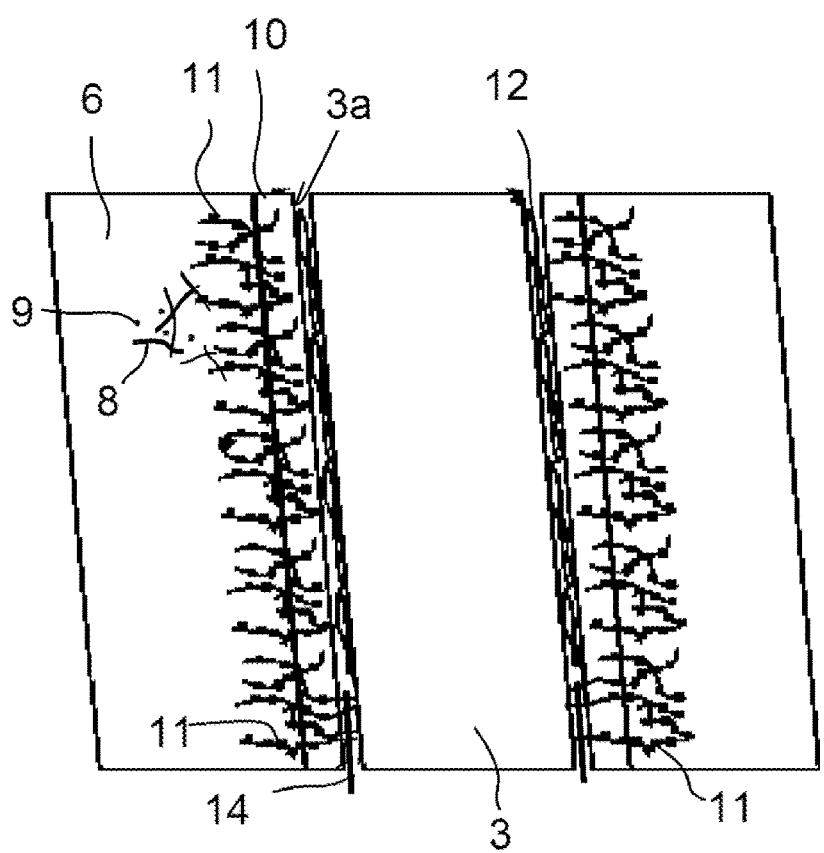
FIG. 2 shows a segment from FIG. 1 showing the connection of the cushion to the support bar.

As can be seen, in particular, in the enlarged detail of FIG. 2, the cushion 5 comprises an upholstery material 6 which is designed, in particular, as a cross-linked fiber material with fibers 8 interlinked or cross-linked. The upholstery material 6 may further comprise additional fillers 9 also received within the cross-linked fibers 8. The fillers 9 may be, e.g., a granulate and/or powder and made by crushing recycled material.

A first layer 10 made of first fibers 11 is attached directly to an exterior surface 3a of the support bars 3. According to this embodiment, the first fibers 11 of the first layer 10 are thermally welded onto the exterior surface 3a of the metal support bars 3 thereby forming the first layer 10. The first fibers 11 protrude outwards away from the connection to the exterior surface 3a into the interior of the cushion 5. Advantageously, the first fibers 11 of the first layer 10 are cross-linked with the surrounding cross-linked fibers 8 so as to enable a direct connection of the upholstery materials 6 to the exterior surface 3a of the metal support bars 3. Thus, the individual first fibers 11 merge into the upholstery material 6 in the outward direction.

The first fibers 11 as well as the further fibers 8 may be single-component fibers of a thermoplastic plastic material. Alternatively, the fibers 11, 8, or even part of the fibers 11, 8 may also be dual-component fibers with an outer plastic layer made of a thermoplastic material, i.e., softening when heated, and an inner fiber material.

According to an embodiment alternative hereto, an adhesive layer 12 is provided at the exterior surface 3a of the support bars 3 attached to which are the fibers 11 of the first layer 10; this is shown in FIG. 2 in an upper area.

According to a further embodiment, a grid 14 of metal or plastics is placed around the support bar 3 through which the first fibers 11 protrude and with which the first fibers 11 are thermally welded or cross-linked respectively. Thus, such a grit 14, indicated in FIG. 2 at the bottom, enlarges the surface for receiving the first fibers of the first layer.

Figure 3:
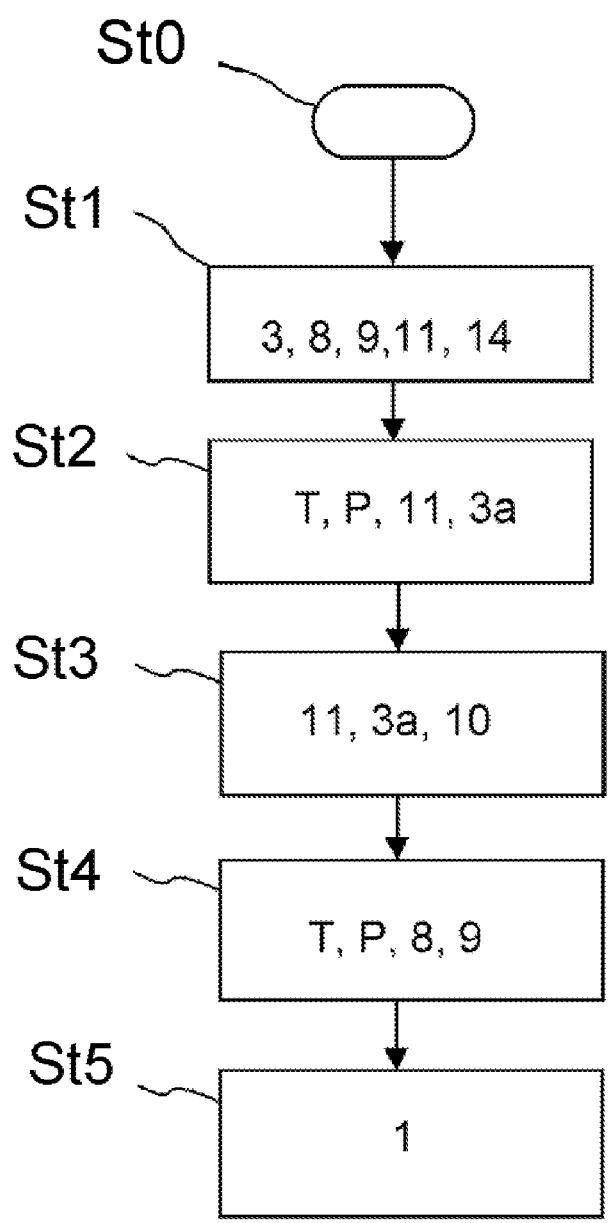
FIG. 3 shows a flow chart of the method for manufacturing according to one embodiment of the present disclosure.

FIG. 3 shows the procedure steps according to an embodiment of a manufacturing method:

Following the start in step St0, in step St1 the starting materials for the manufacturing process are made available. Thus, e.g., the support bars 3 or, respectively, the u-shaped headrest bracket is/are positioned in an oven. Hereby, e.g., the grid 14 may be placed around the support bars 3.

Subsequently, in step St2, the first fibers 11 are blown onto the exterior surface 3a of the support bars 3 under the effect of heat, i.e., at a suitable process temperature T, and under pressure P.

According to step St3, this causes the first fibers 11 at the exterior surface 3a of the support bars 3 to melt and to directly form the first layer 10, whereby at least part of the first fibers 11 protrudes away from the first layer 10 towards the outside.

In the further blowing process, subsequently, in step St4, under heat, i.e., at a suitable process temperature T, and pressure P, the further fibers 8 are blown on, which cross-link with the first fibers 11 and with one another. Further, the additional fillers 9 may be applied. The steps St3 and St4 are preferably carried out continuously, i.e., as a consistent blowing process under heat and pressure.

Thus, in step St5, the headrest 1 is formed completely and is, e.g., cooled subsequently. Thereafter, an outer cover layer may be applied.

Headrests of vehicle seats may comprise one or more support bars made of metal which are received, e.g., in a height adjustable manner, in a backrest. Attached to the at least one support bar is a cushion serving to rest the head of the seat inhabitant. The cushion may be made, e.g., of foam material or other materials and be attached to the at least one headrest bar in the manufacturing process.

One comparative headrest for a vehicle may comprise a support element attached to two headrest bars and forms a central area of the headrest. A foamed body is attached to the support element. The support element makes for a stable receptacle of the foamed body. For making the foamed body a tool with a suitable shape and a suitable inlet area is provided.

Another comparative headrest for a vehicle seat and the corresponding manufacturing method, wherein a firm U-shaped fastening element is provided with an adjustable U-shaped element. The arrangement is received in a cast mold having a geometry corresponding to a cushion to be formed, thereby creating the headrest.

Another comparative headrest is made from a foamed body coupled to a frame of a curved part. Further, a protective layer is provided around the foamed body. A flexible surrounding layer is provided between the foamed body and the frame so that an adhesive surface between the foam and the frame is reduced. The frame is cylindrical and provided with parallel segments and comprises a connecting area, where an elastic element of the surrounding layer surrounds the cylindrical and parallel segments as well as the pipe-shaped connecting area. Hereby, the surrounding layer may be designed shorter than the length of the frame.

Another comparative headrest may comprise a metal reinforcement by means of a bracket with parallel rods interconnected at their upper ends via a spacer. The, e.g., bracket-shaped cushion receives the headrest bars with the connecting middle area, whereby a pocket-shaped cap has an opening in which the cushion is received.

A comparative upholstery element may be made of a vehicle composite material with a three-dimensional stochastically oriented fiber material, where the fiber composite material comprises at least a weldable plastomer.

A comparative motor vehicle element having a corpus and a flocked exterior covering made of flock material which is held by an adhesive sheet on the surface of the corpus, where a fine textile covering is provided which covers the surface and adheres to it, whereby the flock material covers the textile covering.

Another comparative upholstery element as a seat cushion element in a motor vehicle and a method for manufacturing the same, where the seat cushion element comprises a foam region and a fiber region including a fiber material, the fiber material being filled with the foam of the foam region.

A comparative headrest may be formed by means of a foam casting means comprising a lower casting area with a first protrusion and an upper casting area with a second protrusion. The cast parts are used to adapt a cover arrangement, where a headrests part extending towards the outside through a suitable opening.

A comparative headrest frame may be formed from a plastic material and contain a core material with a cross-sectional surface which makes for a rigidity corresponding to a headrest frame made from iron. To that end, the headrest frame comprises at least one elongated leg including a core material embedded in a first plastic material.

Thus, manufacturing of comparative headrests may be quite complex, sometimes needing additional materials and a plurality of manufacturing steps.

The present disclosure is based on the object of creating a seat element for a vehicle seat, in particular, a headrest, and a method of manufacturing thereof allowing for a relatively simple and secure formation of the seat element. This task is solved by a seat element and a method of manufacturing thereof according to the independent claims.

The seat element according to the present disclosure can be manufactured, in particular, by means of the manufacturing method according to the present disclosure; the manufacturing method according to the present disclosure serves, in particular, for manufacturing the seat element according to the present disclosure. The seat element is, in particular, a headrest of a vehicle seat.

Thus, according to the present disclosure, a first layer comprising first fibers is formed around an exterior surface of the at least one metal support bar. The first fibers are welded, in particular, thermally or, respectively, by welding onto the exterior surface thereby allowing good adhesion to the exterior surface of the metal headrest bar. The first layer may be formed exclusively from the welded-on first fibers.

At least part of the first fibers extends outwards away from the first layer and is received in the upholstery material of the cushion. Thus, the cushion is formed around the at least one headrest bar and receives the first fibers. By extending outwards from the first layer, the first fibers form a large surface which is connected to the further upholstery material, in particular, further fibers. This connection may be made, in particular, by means of thermal cross-linking or, respectively, welding, where the first fibers are cross-linked, in particular, with the further fibers, in particular, of the same kind.

Besides the further fibers, the upholstery material may comprise fillers; e.g., foam material or granulates, in particular, made from plastics, thereby attaining a good cross-linking with the sticking-out first fibers.

The present disclosure enables, in particular, an advantageous, cost-efficient, and quick manufacturing process, in that the first fibers are attached to the exterior surface of the headrest bar, in particular, by means of pressure heat. This step of attaching may be carried out, in particular, by blowing on the fibers. Thus, the first fibers form the first layer at the exterior surface which surrounds the exterior surface of the metal headrest bar. Such a welding process provides a good adhesion of the plastic layer to the exterior surface. Thus, advantageous, it is possible to form the first layer surrounding the support bar by the pressed-on fibers alone.

Hereby, at least part of the ends of the first fibers sticks out from the first layer towards the outside so that the ends of the first fibers will cross-link, in particular, with further fibers in the subsequent step of attaching the further upholstery material thereby forming a firm structure.

The step of attaching the further upholstery material may, in particular, may follow immediately after the attaching or blowing-on respectively of the first fibers. Thus, it is possible to firstly form the first layer and subsequently the further cushion material in a continuous process of blowing on fibers, whereby the further upholstery material may comprise, in addition to the further fibers, also further fillers such as, e.g., foam particles and granulates.

Thus, the making of the cushion can be carried out, in particular, by blowing-on fibers as well as a pressing under exertion of pressure and heat in a suitable tool, with the tool determining the shape of the pillow. Hereby, the making may be carried out, in particular, in a furnace or, respectively, a heating means.

Subsequently advantageously, a covering layer is applied onto the cushion.

Thus, a manufacturing procedure is created which is fast or, respectively, comprises relatively few procedure steps.

A further advantage of the present disclosure lies in the fact that recycled plastic material can be used as upholstery material, in particular, for the additional fillers, which may be obtained, e.g., by recycling headrests cushions.

The support bars may be shaped, e.g., u-shaped or bracket-shaped respectively, i.e. two support bars with a connection in the middle region. When attaching the upholstery material, preferably, all regions of the bracket are firmly received.

According to one embodiment, the pillow may be formed by the support bars and the welded cushion material alone, i.e., in particular, by the fibers. Preferably, it is not necessary to apply further structural elements.

According to a further embodiment, a grid may first be placed around the at least one support bar so as to enlarge the surface for receiving the first fibers. The grid may be formed from metal or plastics. Thus, the first fibers adhere to the exterior surface of the support bar and in addition to the grid. Such a manufacturing process, too, can be carried out with little complexity because kit is merely needed to first apply the grip around the support bar. In principle, any part having structured openings can be used as grid.

According to one embodiment, first, a bonding layer or adhesive film may be applied onto the exterior surface or part of the exterior surface of the support bar.

The invention claimed is:

1. A seat element for a vehicle seat, the seat element comprising:
   at least one support bar made of metal,
   a first layer provided at an exterior surface of the at least one support bar, and
   a cushion made of an upholstery material attached to the at least one support bar,
   wherein the first layer comprises first fibers made of a plastic material which are attached directly at the exterior surface, wherein first ends of the first fibers are attached directly to the exterior surface and second ends of the first fibers extend into the upholstery material of the cushion and
   wherein the first fibers sticking out from the exterior surface and/or the first layer are thermally received or thermally cross-linked in the upholstery material.

2. The seat element of claim 1, wherein the seat element is a headrest for a vehicle seat.

3. The seat element of claim 1, wherein the first fibers are welded onto the exterior surface of the at least one support bar thereby forming the first layer.

4. The seat element of claim 3, wherein the first fibers are welded onto the exterior surface by being blown onto the exterior surface under heat and pressure.

5. The seat element of claim 1, wherein the upholstery material comprises further fibers which are welded to one another and to the first fibers.

6. The seat element of claim 5, wherein the first fibers and the further fibers are identical.

7. The seat element of claim 1, wherein the upholstery material comprises one or more filler materials from a group consisting of powdery fillers, granular fillers, and foamy fillers.

8. The seat element of claim 7, wherein the at least one filler material is made from recycled plastic material.

9. The seat element of claim 1, wherein the first layer formed at the exterior surface of the at least one support bar is formed exclusively from thermally welded-on first fibers, the first fibers comprising the plastic material, at least at their exterior surface.

10. The seat element of claim 9, wherein the fibers are formed as single-component fibers made of at least one material from a group consisting of thermally softening plastics, thermoplastic plastics, dual-component fibers having an exterior layer made from thermally softening plastics.

11. The seat element of claim 1, wherein a grid made of plastics or metal is arranged around the exterior surface, and the first fibers are welded onto the exterior surface and onto the grid.

12. The seat element of claim 1, wherein an adhesive layer is applied onto the exterior surface in total or in part.

13. The seat element of claim 1, wherein the seat element comprises two headrest bars, one of which is the at least one support bar, and a middle section connecting the two headrest bars.

14. The seat element of claim 13, wherein the headrest bars and the middle section are parts of a U-shaped bracket.

\* \* \* \* \*